United States Patent [19]

Marto

[11] Patent Number: 5,654,994
[45] Date of Patent: Aug. 5, 1997

[54] PROCESS FOR DETECTING THE STROKE MOTION OF A VALVE MEMBER WHICH IS DISPLACEABLE IN A HOUSING OF AN INJECTION VALVE

[75] Inventor: Heinz-Arno Marto, Weil Der Stadt, Germany

[73] Assignee: Robert Bosch GmbH, Stuttgart, Germany

[21] Appl. No.: 616,872

[22] Filed: Mar. 15, 1996

[30] Foreign Application Priority Data

May 17, 1995 [DE] Germany ............ 195 18 072.0

[51] Int. Cl.⁶ .................................................. G01N 23/00
[52] U.S. Cl. ........................................ 378/1; 378/58
[58] Field of Search ............................ 378/1, 210, 57, 378/58; 73/116, 601

[56] References Cited

U.S. PATENT DOCUMENTS

| 4,667,511 | 5/1987 | Mausner ........................ 73/119 |
| 5,495,514 | 2/1996 | Horbaschek et al. ......... 378/98.7 |

FOREIGN PATENT DOCUMENTS

| 919326 | 2/1963 | United Kingdom . |
| 2047887 | 12/1980 | United Kingdom . |

*Primary Examiner*—Don Wong
*Attorney, Agent, or Firm*—Edwin E. Greigg; Ronald E. Greigg

[57] ABSTRACT

A process for detecting the stroke motion of a body, which is displaceable in a housing, such as a valve member of an injection valve, by a measurement device disposed outside the housing, in which the stroke motion of the body is detected by means of an X-radiation penetrating the housing and detected by the measuring device.

22 Claims, 2 Drawing Sheets

PROCESS FOR DETECTING THE STROKE MOTION OF A VALVE MEMBER WHICH IS DISPLACEABLE IN A HOUSING OF AN INJECTION VALVE

BACKGROUND OF THE INVENTION

The invention is based upon a process for detecting the stroke motion of a body which is displaceable in a housing.

Processes of this kind are necessary for example in order to be able to reliably detect the precise stroke course of a valve member of an injection valve as a function of its injection pressure during the entire injection time, in particular of an injection valve inserted into the combustion chamber of an internal combustion engine. In modern internal combustion engines, the course of the fuel injection, which is influenced by injection pressure and valve member stroke, is of great significance since the combustion process in the combustion chamber can be considerably influenced by these factors, in particular with regard to pollutant emissions and fuel consumption.

Thus the combustion pressure peaks produced by ignition delay in auto-ignition internal combustion engines can be prevented by subdividing the fuel injection into a pre-injection quantity and a main injection quantity. For this kind of subdivision of the course of injection, the opening stroke motion of the valve member of the injection valve is divided into two phases; in a pre-injection phase, first only a small injection volume is released by the mobile valve member, and in an ensuing injection phase the entire injection volume is released. For this kind of embodiment of the opening stroke motion of the valve member of the injection valve, as disclosed for example in German Utility Model 92 059 759, two valve springs which act on the valve member in the closing direction are provided on the injection valve, of which a first valve spring constantly acts upon the valve member and a second valve spring engages the valve member only after it executes a pre-stroke in the opening direction. The injection pressure acting on the valve member in the opening direction first brings about an opening stroke motion (pre-stroke) of the valve member counter to the restoring force of the first valve spring, by means of which the injection cross section which determines the pre-injection quantity is opened. After the pre-stroke is carried out, the valve member comes into contact with the second valve spring; the pressure increase of the fuel delivered to the injection valve now is no longer sufficient to overcome the force of both valve springs, so that the valve member pauses for a short time in its stroke position. With the further pressure increase of the fuel, then the force of the second valve spring is also overcome, and this opening stroke motion of the valve member counter to the force of both valve springs now opens the entire opening cross section at the injection valve, so that the main injection quantity reaches the combustion chamber of the internal combustion engine via the injection opening.

To optimally adapt the injection valve to the requirements of the respective internal combustion engine, it is necessary to be able to precisely adjust the time of the pre-injection and consequently the pre-injection quantity, or to precisely adjust the onset of the main injection, which depends directly on injection pressure at the injection valve.

To determine the time of the onset of the main injection as a function of the pressure increase in the injection line leading to the injection valve, German Patent Application 41 08 416, U.S. Pat. No. 5,271,270, for example, discloses the insertion of a so-called needle motion sensor into the injection valve; this sensor detects the course of the stroke motion of the valve member electromagnetically or in a directly mechanical manner and registers it via a display device. At the same time, the pressure in the injection line is determined via a pressure sensor whose measurement values are likewise plotted over time so that an injection pressure value can be assigned to the onset of the second stroke phase (main injection), which appears as a plateau which adjoins the pre-injection stroke in the course of the opening stroke. In this manner, when there is a predetermined injection pressure value, the time of the onset of the main injection can be adapted to the respective requirements via changing the prestressing of the valve springs and adjusting the pre-stroke path of the valve member (the same is true for the closing of the valve).

The known measurement process, however, has the disadvantage that the needle motion sensor must be inserted into the injection valve and, since it is an expensive component, cannot remain there, but must also be removed again, which results in a high assembly expenditure and makes this measurement process particularly unsuitable for controlling mass production.

Another known process, in which the time of the onset of the second opening stroke of the valve member is determined only from the course of the pressure in the injection line (change in the speed of pressure increase), is not precise enough because of the very short times and dynamic effects, particularly with injection valves which operate at high pressures.

OBJECT AND SUMMARY OF THE INVENTION

The process according to the invention for detecting the stroke motion of a body which is displaceable in a housing which can be used in a particularly advantageous manner to detect the valve member stroke motion of an injection valve but can also be used for similar measurement procedures in parts which move in housings, has the advantage over the prior art that the measurement of the stroke course of the body, in particular the valve member, can be carried out via an external measurement device so that the injection valve does not have to be altered and the measurement can be carried out in a simple, standardizable form, regardless of the structural type of injection valve member (nozzle type). The process according to the invention can be advantageously used both for application purposes and for a control of mass production, since injection nozzles have a standardized external structure so that even different nozzle types can be tested without altering the receptacle element of the measurement device.

The detection of the stroke motion of the body or the valve member stroke of the injection valve is carried out to that end, according to the invention, by means of an X-radiation which penetrates the housing of the injection valve; in a radiation receiver detects the change of the radiation intensity and transmits it to an electronic display device in which the change in intensity of the X-radiation over time is displayed, which can be assigned to a particular stroke position of the valve member. As a result of the simultaneous detection of the pressure course in the injection line of the injection valve, a precise valve member stroke value can be easily assigned to each point of the pressure course. This measurement process, in which a subsequent comparison to a stored set value curve can be carried out, can be automated very easily, which has an advantageous effect on both measurement time and measurement accuracy.

To detect the valve member stroke motion, the injection valve is penetrated by radiation perpendicular to the axis of the valve member, in a region in which its stroke motion produces a change of the emerging radiation intensity. This prerequisite exists preferably in regions in which the valve member has as large a change in cross section as possible, preferably the conical cross section reduction on the injection end of the valve member. However, there are also other possible alternatives, for example different materials on the body which is moved, whose entry into and exit from the X-ray beam change the radiation intensity emerging from the housing, or end faces or shoulders on the valve member which enter into the X-ray beam in the course of the stroke motion.

In order to reliably detect the radiation intensity change by means of the detector, for example a photoelectric multiplier or photon counter, the X-rays emerging from the radiation source are furthermore aligned into a narrow, limited beam by means of a slit diaphragm, preferably a lead collimator.

In order to be able to reliably prevent an emission of X-radiation from the measuring device during the measurement procedure, the device is disposed in a chamber whose walls are made of a radiation-proof material and which is accessible via a door (similar to, a microwave oven), or the course along which the radiation is measured is partitioned off from the outside and is consequently inaccessible.

In order to prevent hydraulic properties of the injection valve or vibrations from influencing the measurement results, and in order to be able to detect the change in intensity of the X-radiation in a reliable, reproducible, and precise manner, the device is constructed so that the pressure acting upon the valve member is built up in such a way that the opening stroke motion of the valve member is considerably delayed in relation to the conditions during the injection in the internal combustion engine. This is achieved in the exemplary embodiment by means of a closed hydraulic system, for which purpose the injection valve protrudes with its injection opening into a closed chamber of low volume, which is rapidly filled by the injection valve during the injection process, so that in comparison to the operation of the internal combustion engine, a virtually quasi-static state occurs at the valve member as a consequence of the great counterpressure. Since only the pressure engaging the valve member in the opening direction and the restoring force of the valve springs are decisive for the stroke motion of the valve member as a function of the injection pressure on the valve member, the injection openings of the injection valve could theoretically also be closed.

In the exemplary embodiment, fuel is used as a pressure fluid, the rate of pressure increase is reduced from approximately 800,000 bar/s at the internal combustion engine to approximately 100 bar/s at the measurement device. As an alternative to the closed hydraulic system, an open system with very large throughputs is also possible, which has the disadvantage, however, of a relatively large high pressure pump.

The closed chamber on the injection valve is advantageously embodied as a closed pressure chamber whose chamber walls are comprised of a radiation-permeable material, preferably aluminum.

The detection of the injection pressure is carried out in a known manner by a pressure sensor, which can be embodied as a strain gauge or a piezotransducer, and its measurement values are plotted over time, analogous to the measurement results of the X-radiation device that are plotted by means of an oscilloscope, for example, so that as described above, a pressure value can be assigned to the opening and closing stroke course of the valve member.

The measurement process according to the invention is particularly advantageous for measuring injection valves of internal combustion engines with a stepped valve member stroke course for a pre-injection and main injection (so-called 2-spring nozzle holder combinations), but is also suitable for measuring any kind of body, which can move inside a housing, in particular injection valves with an axially displaceable valve member.

The invention will be better understood and further objects and advantages thereof will become more apparent from the ensuing detailed description of preferred embodiments taken in conjunction with the drawings.

BRIEF DESCRIPTION OF THE DRAWINGS

An exemplary embodiment of a device, which is for carrying out the process according to the invention for determining the injection pressure in an injection valve as a function of the valve member stroke, is shown in the drawings and is explained in detail below.

DESCRIPTION OF THE PREFERRED EMBODIMENTS

Figure 1:
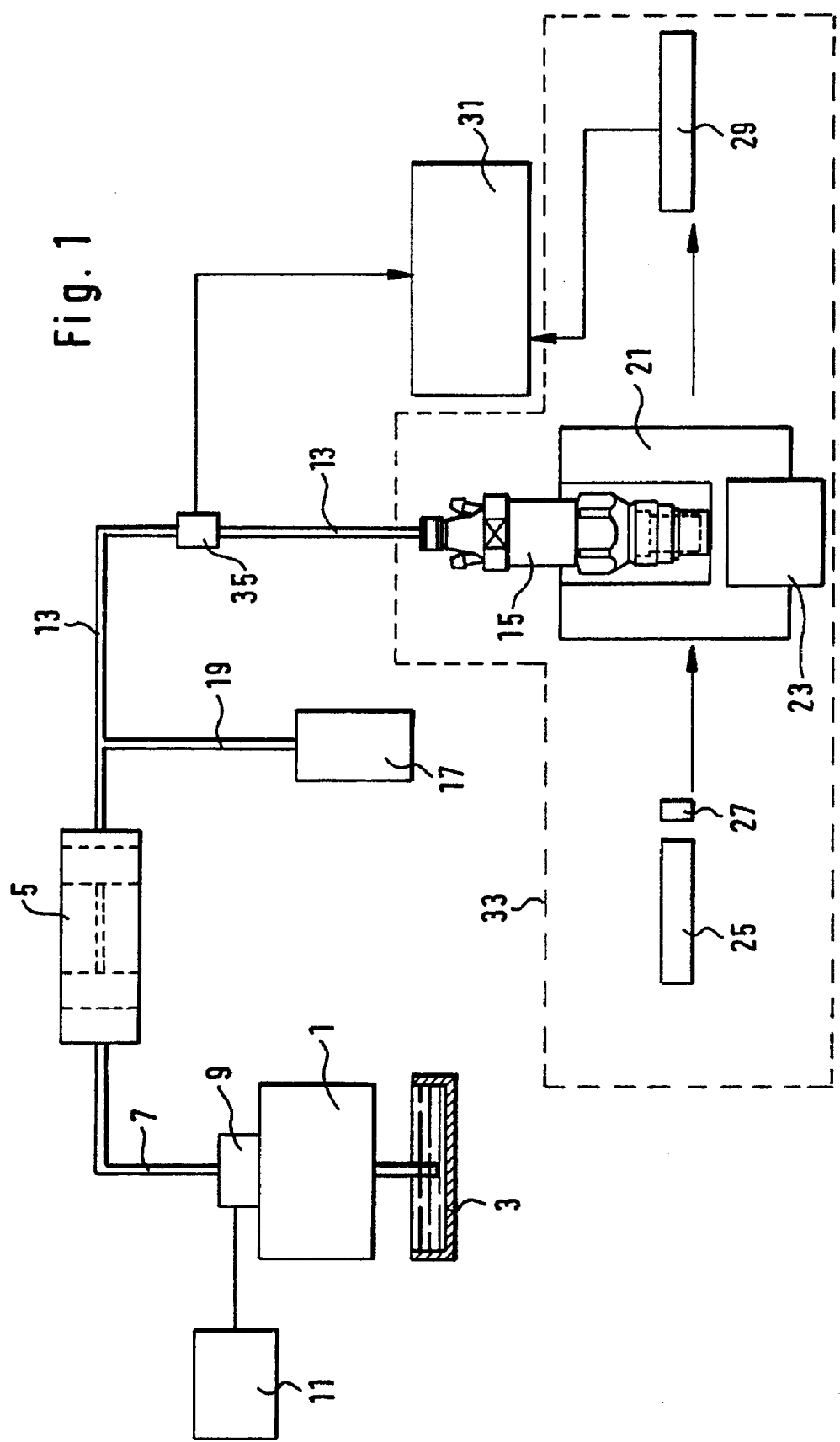
FIG. 1 shows an exemplary embodiment of the measurement device in a schematic representation.

The device, which is schematically represented in FIG. 1 and is for carrying out the measurement process according to the invention to detect the valve member stroke motion of an injection valve, preferably as a function of injection pressure, has a hydraulic unit 1, which is embodied as a pressure pump and supplies fuel from a storage tank 3 via a pressure line 7 to a hydraulic pressure intensifier 5. In the exemplary embodiment, the hydraulic unit 1 delivers fuel with a pressure between 4 and 150 bar, and the pressure course can be changed via an adjustable valve 9. This valve 9, which is preferably inserted in the pressure line 7, is embodied as a proportional valve whose through flow is controlled by a function generator 11; a pressure increase rate of approximately 100 bar/s is preferably set. The fuel delivery pressure is increased at the ratio of 1:5 in the hydraulic pressure intensifier 5; on the high pressure side, an injection line 13 leads from the pressure intensifier 5, and discharges into an injection valve 15 to be tested. Furthermore, a so-called manual testing stand 17, preferably a manually actuatable piston pump, is connected to a bypass line 19 leading from the injection line 13, and carries out the filling and resetting of the pressure intensifier 5.

The injection valve 15 to be measured is inserted into a receptacle element 21, not shown in detail; the injection end of the injection valve sealingly protrudes into a pressure chamber 23 whose volume is relatively low in comparison to the delivery rate delivered to the injection valve 15 via the injection line 13 and which is rapidly filled by the injection valve during the measurement process. The receptacle element 21 and the pressure chamber 23 are made of a material which is X-ray-permeable, preferably aluminum. A radiation source 25 and a receiving part 29 for X-radiation are disposed opposite each other on the outer walls of the receptacle element 21 or the pressure chamber 23, essentially perpendicular to the axis of the injection valve 15. The radiation source 25 is embodied as an X-ray tube, which on the exit end is preceded by a slit diaphragm 27, preferably a lead collimator, via which the emitted X-radiation is aligned into a narrow, limited beam. The receiving part 29 (detector), which is preferably disposed axially parallel and on the opposite side of the X-ray tube 25, is embodied as a photoelectric multiplier or photon counter whose measurement signal is transmitted to an electronic evaluation device 31, which plots and displays the change of the radiation intensity over time. This evaluation device 31 is preferably embodied by a transient recorder or an oscilloscope to which a computer that processes the measurement values is connected. To reliably prevent the measurement device from emitting radiation toward the outside, the injection valve 15, receptacle element 21, pressure chamber 23, X-radiation part 25, and X-radiation receiving part 29 are disposed in a radiation chamber 33, whose walls are made of a radiation absorbing or reflecting material and which is accessible via a door, not shown.

To determine the injection pressure course in the injection line 13, a pressure sensor 35 is moreover inserted into it in a known manner; this sensor can be embodied as a strain gauge or piezotransducer, and its measurement values can likewise be supplied to the electronic display device 31, in which they can be recorded over time and stored.

Figure 2:
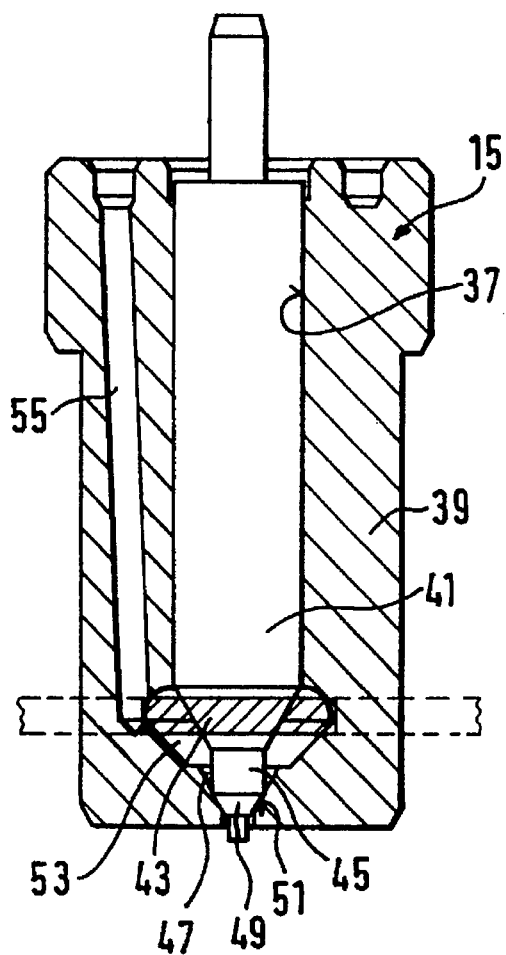
FIGS. 2–4 show the position of the X-ray beam on two types of injection nozzle.
Figure 3:
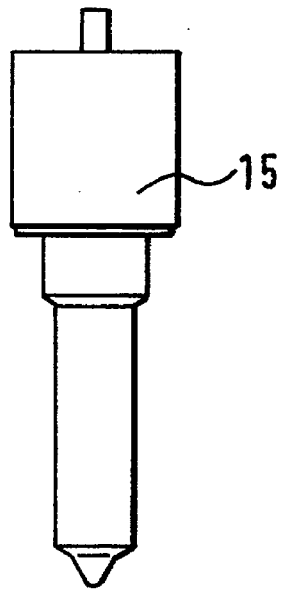
Figure 4:
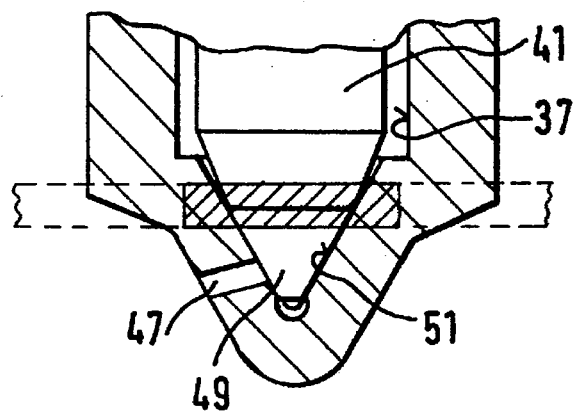

For an exact depiction of the passage of the X-radiation through the injection valve 15, two exemplary embodiments of injection valves 15 are shown in FIGS. 2 to 4. FIG. 2 shows a fuel injection valve for internal combustion engines, which is embodied as a pivot nozzle, with a valve member 41, which can move axially in a bore 37 of a valve housing 39 and which on its lower end oriented toward the combustion chamber, tapers down, forming a pressure shoulder 43, into a pintle 45 which protrudes into an injection opening 47. A conical valve sealing face 49 is provided on the pintle 45, which sealing face cooperates with a conical valve seat face 51 on the valve body 39 for the purpose of opening the injection opening 47. In the region of the pressure shoulder 43, the bore 37 enlarges into a pressure chamber 53 into which a high pressure conduit 55 discharges, which communicates with the injection line 13. The closing force is exerted on the valve member 41 in a manner analogous to that in German Utility Model 92 059 759 by means of two valve springs, not shown in detail, of which a first valve spring acts upon the valve member 41 continuously and a second valve spring comes into contact with the valve member 41, at least indirectly, only after a particular opening stroke path of the valve member 41 is passed through.

The X-ray beam penetrates the injection valve 15 in the region of the pressure shoulder 43, perpendicular to the axis of the valve member 41 since the measurement sensitivity of the measurement device is at its greatest in the region where the material thickness of the valve member 41, over the course of its stroke, changes the most considerably.

The second exemplary embodiment of the injection valve 15 shown in FIGS. 3 and 4 is embodied as a hole-type nozzle which only differs from the pivot nozzle shown in FIG. 2 essentially in the type of injection opening 47. The bore 37 which guides the valve member 41 is embodied as a blind bore, from whose closed end oriented toward the combustion chamber an injection bore 47 leads. The end of the bore 37 oriented toward the combustion chamber is embodied as conical; the conical flanks act as a valve seat face 51, which cooperates with a conical valve sealing face 49 on the combustion chamber end of the valve member 41.

In this exemplary embodiment, as well, the X-ray penetration occurs in the region of the greatest material thickness change of the valve member 41, which is disposed at the level of the conical valve sealing face 49. This embodiment of the injection valve 15, analogous to FIG. 2, is also acted upon in the closing direction by two valve springs; reference may be made to German Utility Model 92 059 759 for the known manner of function of injection valves of this kind, having a pre-injection and a main injection.

The process according to the invention works in the following manner. The hydraulic unit 1 supplies a pressure fluid, preferably fuel, via the pressure line 7 to the pressure intensifier 5, which for its part delivers the medium, preferably fuel, which is disposed in its pressure chamber at a high pressure (up to 700 bar), via the injection line 13 to the injection valve 15, where in a known manner the fuel pressure acting upon the valve member 41 produces an opening stroke motion of the valve member 41 counter to the restoring force of the valve springs. The fuel emerging from the injection valve 15 at the injection opening 47 very rapidly fills the pressure chamber 23 so that a quasi-static state occurs in the closed hydraulic system, which considerably delays the opening stroke motion of the valve member 41; in the pressure increase in the hydraulic system can be influenced by the adjustable valve 9.

The X-ray beam emitted by the X-ray tube 25 is collimated at the slit diaphragm 27 and then passes through the injection valve in the regions shown in FIGS. 2 and 4. As a result of the valve member stroke, a change in intensity of the penetrating X-ray beam is brought about, which is proportional to the valve member stroke, is detected by the receiving part 29, and is transmitted to the evaluation device 31 where this signal is plotted over time. At the same time, the injection pressure in the injection line 13 is detected via the pressure sensor 35 and likewise transmitted as a signal to the evaluation device 31.

The pressure increase in the injection line 13 is carried out along a linear pressure incline; this steady pressure increase results in a very smooth valve member stroke with a pronounced pre-stroke plateau between the pre-stroke motion counter to the force of the first valve spring and the remaining stroke motion counter to the force of both valve springs, so that the time of the onset of the remaining stroke, which corresponds to the onset of the main injection, can be very precisely determined. Via the simultaneous determination of the injection pressure in the injection line 13, now the injection pressure at the onset of the main injection can be classified precisely.

When the described measurement device is used for controlling the correct adjustment of valve springs (which is decisive for the correct opening stroke course of the valve member) in the mass production of injection valves, the determined measurement curves of the injection pressure and stroke course are compared to a set value curve, so that defective injection valves can be quickly recognized.

Using the process according to the invention with the aid of X-ray absorption, it is consequently possible in a structurally simple manner to assign an injection pressure to the chronological course of the opening stroke motion of the valve member in a multitude of injection valves, so that the injection pressure can be precisely determined at particular stroke positions of the valve member. The process is particularly suited for use in mass production since it can be easily automated.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A process for detecting a stroke motion of a body which is displaceable in an X-ray permeable housing, which comprises inserting at least a portion of said housing which contains said body within an X-ray permeable receptacle, subjecting the body to an X-radiation emitted by an X-ray source which penetrates the housing at a point of the body at which a stroke motion of the body produces a change in the emitted radiation intensity, detecting the intensity of the radiation that penetrates the receptacle, the housing and the body and determining the stroke of the body of a measure of the detected X-radiation intensity.

2. A process according to claim 1, wherein said body consists of a valve member (41) in an injection valve (15) as a function of an injection pressure, said process further comprises the steps of detecting the stroke motion of the valve member (41) of the injection valve (15) by means of said X-radiation in accordance with the injection pressure applied to said valve member, and continuously detecting the fluid pressure in a pressure fluid supply line (13) between a high pressure source (1, 5) and the injection valve (15), whereby pressure applied to said injection valve produces an opening stroke motion of the valve member (41) detecting and measuring the X-radiation passing by said injection valve and incident upon a detector.

3. A process according to claim 2, in which the pressure acting upon the valve member (41) of the injection valve (15) is built up smoothly and in a delayed manner in comparison to an injection pressure course which occurs when the injection valve is used as intended in an internal combustion engine.

4. A process according to claim 3, in which the pressure increase at the injection valve (15) during the measurement process is carried out at about 100 bar/s.

5. A process as set forth in claim 1 which comprises positioning said X-ray source on one side of said X-ray permeable receptacle, and positioning a X-ray radiation detection means on an opposite side of said X-ray permeable housing directly in alignment with said X-ray source.

6. A process as set forth in claim 5 which comprises collimating said radiation emitted by said radiation source to produce a fine line beam of X-radiation.

7. A process as set forth in claim 6 which comprises enclosing said X-radiation source, said receptacle, said detector means, and radiation intensity measuring means within a X-radiation impervious housing.

8. A device for measuring a stroke of a movable body within a housing which comprises an X-ray permeable receptacle in which said housing is positioned, an X-ray source on one side of said receptacle which emits X-radiation toward said receptacle, an X-radiation detector on an opposite side of said receptacle for detecting any radiation that passes said receptacle, said housing and said body, and means for continuously registering a value of the radiation intensity detected over a period of time whereby the stroke of said movable body is determined.

9. A device as set forth in claim 8, in which said housing is a valve body and said movable body is a valve member.

10. The device according to claim 9, in which the X-radiation emitted by said X-ray source is perpendicular to an axis of the valve member, in a region of a conical cross section reduction on the valve member (41).

11. A device according to claim 8, in which the radiation source (25) is embodied as an X-ray tube that includes a beam exit, a slit diaphragm (27) aligns the X-radiation emitted by said X-ray tube into a narrow, limited beam, and that the X-ray detector for detecting the X-radiation that penetrates the injection valve includes an electronic device (31) for detecting and displaying the radiation intensity that passes said receptacle, said housing, and said movable body.

12. The device according to claim 11, in which the device and an unblocked course along which the emitted radiation is measured is disposed in a radiation chamber (33) whose chamber walls are made of a radiation-impervious material.

13. A device as set forth in claim 11, which includes a fluid pressure source which applies a pressure onto said valve member to produce an opening stroke motion on said valve member and a fluid pressure measuring device which detects the fluid pressure.

14. A device according to claim 13, in which the measurement device which detects the fluid injection pressure is embodied by a pressure sensor (35), inserted into a pressure injection line (13), whose measurement values are detected by an electronic device (31) and displayed as a function of time.

15. A device according to claim 14, in which the pressure source is embodied as a high pressure pump (5), which in combination with said injection valve (15) forms a closed hydraulic system.

16. A device according to claim 15, in which the injection valve (15) sealingly protrudes into an injection opening (47) into a closed pressure chamber (23) of low volume, whose chamber walls are made of a material which is X-ray-impervious.

17. A device as set forth in claim 16, in which the injection valve (15) has a valve member (41) which is axially displaceable in a bore (37) of a housing (39), and which member, on its one end, has at least one conical cross section reduction and a valve sealing face (49) with which the valve sealing face cooperates with a valve seat face (51) on the housing (39), and with at least one injection opening (47) in the housing (39) whose hydraulic communication with the injection line (13) closed by the sealing face (49) of the valve member (41).

18. A device according to claim 17, in which first and second valve springs which act upon the valve member (41) in the closing direction are provided on the injection valve (15), said first valve spring acts upon the valve member (41) continuously and said second valve spring comes into contact, at least indirectly, with the valve member (41) only after the valve member traverses a particular opening stroke path.

19. A device according to claim 18, for detecting a stepped stroke motion of the valve member of the injection valve as a function of the pressure acting upon the valve member in the opening direction.

20. A device for carrying out the process according to claim 8, in which the radiation source (25) is embodied as an X-ray tube which includes a beam exit, a slit diaphragm (27) aligns the emitted X-radiation into a narrow, limited beam, and that the X-radiation detector (29) for receiving the X-radiation penetrating the injection valve is connected to an electronic device (31) for detecting and displaying the radiation intensity.

21. The device according to claim 20, in which the X-radiation emitted by said X-ray source is perpendicular to an axis of the valve member, in a region of a conical cross section reduction on the valve member (41).

22. The device according to claim 20, in which the device is disposed in a radiation impervious chamber (33).

\* \* \* \* \*